UNITED STATES PATENT OFFICE.

THEODORE HUNT, OF ST. LOUIS, MISSOURI.

COMPOSITION FOR WATERPROOFING AND PRESERVING WALLS OF BUILDINGS.

SPECIFICATION forming part of Letters Patent No. 282,082, dated July 31, 1883.

Application filed April 30, 1883. (No specimens.)

*To all whom it may concern:*

Be it known that I, THEODORE HUNT, a citizen of the United States, residing at St. Louis, and State of Missouri, have invented a new and useful Compound for Waterproofing and Preserving Walls of Buildings, of which the following is a specification.

This invention relates to compounds for waterproofing, rendering non-absorbent, and preserving stone, brick, and other walls of buildings; and it consists of the following ingredients, mixed or combined in about the annexed proportions, viz: kerosene-oil, naphtha, or other hydrocarbon, one gallon; paraffine, one-half pound; benzine or Japan driers, one pint; naphthaline, four ounces.

The compound is prepared as follows: Heat the kerosene, naphtha, or other hydrocarbon, and melt the paraffine separately to a fluid state. Mix the two together by pouring one into the other. Then add the driers and naphthaline. The effect of this is to thoroughly combine the kerosene-oil, naphtha, or other hydrocarbon and the paraffine, so that no settlement or sediment is formed, and the kerosene or hydrocarbon is charged with paraffine. The proportionate quantity of paraffine to be used will necessarily be varied, because the hydrocarbon will dissolve or take up more of it in warm than in cold weather, and some qualities of brick and stone being more porous than others will require the hydrocarbon to be more plentifully charged with paraffine in order to be acted upon effectively by it.

The compound is applied in its natural liquid state, with an ordinary paint-brush, or with a sponge or cloth saturated with it, onto the surface of the material or wall it is desired to treat.

I claim as my invention and desire to secure by Letters Patent of the United States—

1. The herein-described compound or liquid for waterproofing, rendering non-absorbent, and preserving from the destroying effects of the atmosphere stone, brick, and other walls of buildings, which said compound consists of kerosene-oil, naphtha, or any other hydrocarbon, paraffine, Japan or benzine driers, and naphthaline, in about the proportions herein set forth.

2. The method of waterproofing, rendering non-absorbent, and preserving stone, brick, and other walls of buildings by means of the herein-described liquid compound of hydrocarbon, paraffine, Japan or benzine driers, and naphthaline, applied substantially as set forth.

In testimony that I claim the foregoing as my own I have hereto affixed my signature in presence of two witnesses.

THEODORE HUNT.

Witnesses:
RICHARD T. BISHOP,
LOUIS D. PICOT.